United States Patent [19]
Arlt, III

[11] Patent Number: 5,641,248
[45] Date of Patent: *Jun. 24, 1997

[54] VARIABLE SPRING RATE COMPRESSION ELEMENT AND RISER TENSIONER SYSTEM USING THE SAME

[75] Inventor: Edward J. Arlt, III, Arlington, Tex.

[73] Assignee: Continental EMSCO Company, Garland, Tex.

[*] Notice: The term of this patent shall not extend beyond the expiration date of Pat. No. 5,482,406.

[21] Appl. No.: 416,292

[22] Filed: Apr. 4, 1995

Related U.S. Application Data

[63] Continuation-in-part of Ser. No. 47,810, Apr. 15, 1993.
[51] Int. Cl.$^6$ ............................................... B63B 35/44
[52] U.S. Cl. .................. 405/195.1; 166/350; 405/223.1
[58] Field of Search ........................ 405/195.1, 224, 405/212, 213, 214, 215, 203, 204, 205; 166/350, 359, 367; 267/140.13, 140.2, 241.4, 140.4, 141.3, 141.6

[56] References Cited

U.S. PATENT DOCUMENTS

| | | | |
|---|---|---|---|
| Re. 30,262 | 4/1980 | Schmidt | 267/152 |
| 2,069,270 | 2/1937 | Piron | 267/63 |
| 2,492,049 | 12/1949 | Krone et al. | 137/21 |
| 2,553,636 | 5/1951 | Dath | 213/40 |
| 2,559,743 | 7/1951 | Williams | 213/45 |
| 2,598,762 | 3/1952 | Dath | 213/40 |
| 2,656,182 | 10/1953 | Willison | 267/63 |
| 2,702,703 | 2/1955 | Franceschetti | 267/63 |
| 2,724,588 | 11/1955 | Sheets | 267/35 |
| 2,727,534 | 12/1955 | Briede | 137/615 |
| 2,762,600 | 9/1956 | Mordarski et al. | 248/358 |
| 2,781,052 | 2/1957 | Schaetzly | 137/276 |
| 2,836,413 | 5/1958 | Hirst | 267/21 |
| 2,927,786 | 3/1960 | Templeton | 267/8 |
| 2,953,161 | 9/1960 | Muller | 137/615 |
| 3,086,552 | 4/1963 | Ragsdale | 137/615 |
| 3,086,765 | 4/1963 | Zanow | 267/63 |
| 3,434,708 | 3/1969 | Hawk | 267/63 |
| 3,480,268 | 11/1969 | Fishbaugh | 267/1 |
| 3,489,402 | 1/1970 | Cobley | 267/1 |
| 3,498,472 | 3/1970 | Rodgers et al. | 212/8 |

(List continued on next page.)

FOREIGN PATENT DOCUMENTS

| | | |
|---|---|---|
| 0045651 | 2/1982 | European Pat. Off. . |
| 975122 | 8/1961 | Germany . |
| 130490 | 1/1951 | Sweden . |
| 626177 | 8/1949 | United Kingdom . |
| 686211 | 1/1953 | United Kingdom . |
| 698953 | 10/1953 | United Kingdom . |
| 703641 | 2/1954 | United Kingdom . |
| 793666 | 4/1958 | United Kingdom . |
| 1138059 | 12/1968 | United Kingdom . |
| 1277055 | 6/1972 | United Kingdom . |
| 1396535 | 6/1975 | United Kingdom . |
| 1506523 | 4/1978 | United Kingdom . |
| 2000253 | 1/1979 | United Kingdom . |
| 2113799 | 8/1983 | United Kingdom . |
| 2160619 | 12/1985 | United Kingdom . |
| 2204898 | 11/1988 | United Kingdom . |
| 2250763 | 6/1992 | United Kingdom . |
| 2259747 | 3/1993 | United Kingdom . |
| 2276697 | 10/1994 | United Kingdom . |
| WO88/00273 | 1/1988 | WIPO . |
| WO90/14528 | 11/1990 | WIPO . |

OTHER PUBLICATIONS

Maritime Hydraulics, Advertisement for Top Mounted Drill String Compensators, p. 5.

*Primary Examiner*—Dennis L. Taylor
*Attorney, Agent, or Firm*—Arnold, White & Durkee

[57] ABSTRACT

A compression element having a deflectable elastomeric member is disclosed. The compression element exhibits a decreasing axial spring rate in response to axial movement and compression of the deflectable member. The compression element may be used alone or in combination with other compression elements in riser tensioner systems to maintain a substantially constant upward tensioning force on a riser as it moves axially relative to a floating platform.

16 Claims, 10 Drawing Sheets

U.S. PATENT DOCUMENTS

| | | | |
|---|---|---|---|
| 3,508,409 | 4/1970 | Cargile, Jr. | |
| 3,537,696 | 11/1970 | Webster | 267/63 |
| 3,547,426 | 12/1970 | Hart et al. | 267/1 |
| 3,556,554 | 1/1971 | Saward | 280/124 |
| 3,575,403 | 4/1971 | Hamel | 267/63 |
| 3,606,295 | 9/1971 | Appleton | 267/63 |
| 3,677,535 | 7/1972 | Beck | 267/63 |
| 3,684,271 | 8/1972 | Arthur | 267/152 |
| 3,788,073 | 1/1974 | Castela et al. | 60/413 |
| 3,788,074 | 1/1974 | Castela et al. | 60/413 |
| 3,806,106 | 4/1974 | Hamel et al. | 267/152 |
| 3,830,483 | 8/1974 | Gaydecki | 267/63 |
| 3,831,920 | 8/1974 | Meldrum et al. | 267/137 |
| 3,831,922 | 8/1974 | Appleton | 267/140 |
| 3,901,495 | 8/1975 | Suzuki | 267/153 |
| 3,958,840 | 5/1976 | Hickox et al. | 308/2 |
| 3,993,295 | 11/1976 | Suzuki et al. | 267/152 |
| 3,997,151 | 12/1976 | Leingang | 267/152 |
| 4,004,532 | 1/1977 | Reynolds | 114/256 |
| 4,043,545 | 8/1977 | Dial et al. | 267/116 |
| 4,084,801 | 4/1978 | Landers et al. | 267/140 |
| 4,105,266 | 8/1978 | Finney | 308/237 |
| 4,140,304 | 2/1979 | Ghrist | 267/63 |
| 4,198,037 | 4/1980 | Anderson | 267/153 |
| 4,324,194 | 4/1982 | Elliston | 114/264 |
| 4,364,323 | 12/1982 | Stevenson | 114/265 |
| 4,379,657 | 4/1983 | Widiner et al. | 405/195 |
| 4,449,854 | 5/1984 | Nayler | 405/195 |
| 4,489,962 | 12/1984 | Caumont et al. | 285/263 |
| 4,577,842 | 3/1986 | Shtarkman | 267/140.1 |
| 4,603,843 | 8/1986 | Bechu | 267/35 |
| 4,604,940 | 8/1986 | Mendelsohn et al. | 89/1.816 |
| 4,617,998 | 10/1986 | Langner | 166/345 |
| 4,640,487 | 2/1987 | Salter | 248/571 |
| 4,662,786 | 5/1987 | Cherbonnier | 405/195 |
| 4,662,791 | 5/1987 | Spicer | 405/212 |
| 4,729,694 | 3/1988 | Peppel | 405/195 |
| 4,756,512 | 7/1988 | Toms | 267/70 |
| 4,759,662 | 7/1988 | Peppel | 405/195 |
| 4,807,857 | 2/1989 | Wolf et al. | 267/140.3 |
| 4,883,387 | 11/1989 | Myers et al. | 405/195 |
| 4,883,388 | 11/1989 | Cherbonnier | 405/195 |
| 4,886,397 | 12/1989 | Cherbonnier | 405/195 |
| 4,892,444 | 1/1990 | Moore | 405/195 |
| 4,968,010 | 11/1990 | Odobasic | 267/162 |
| 4,997,171 | 3/1991 | Toms | 267/294 |

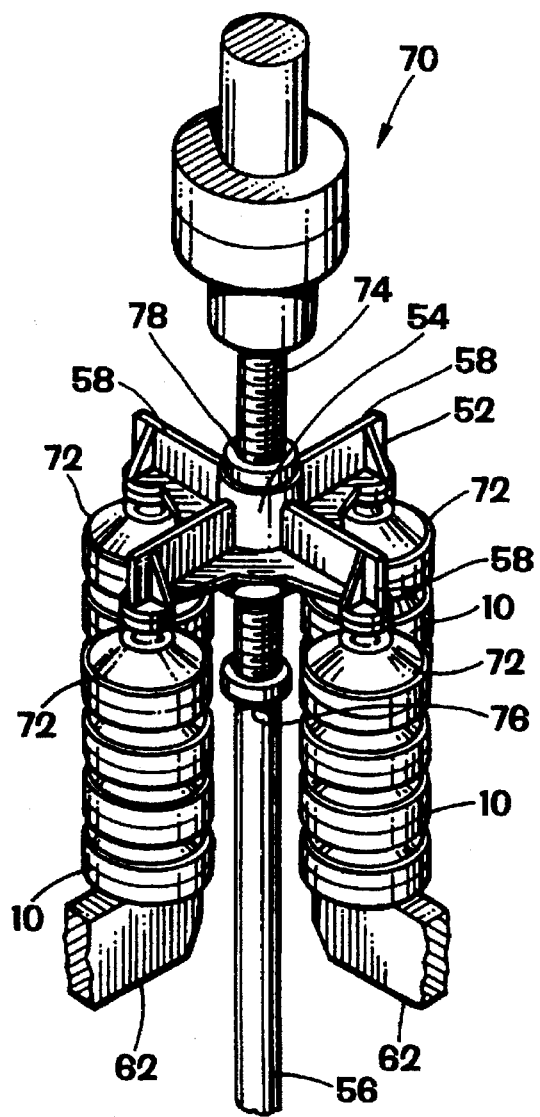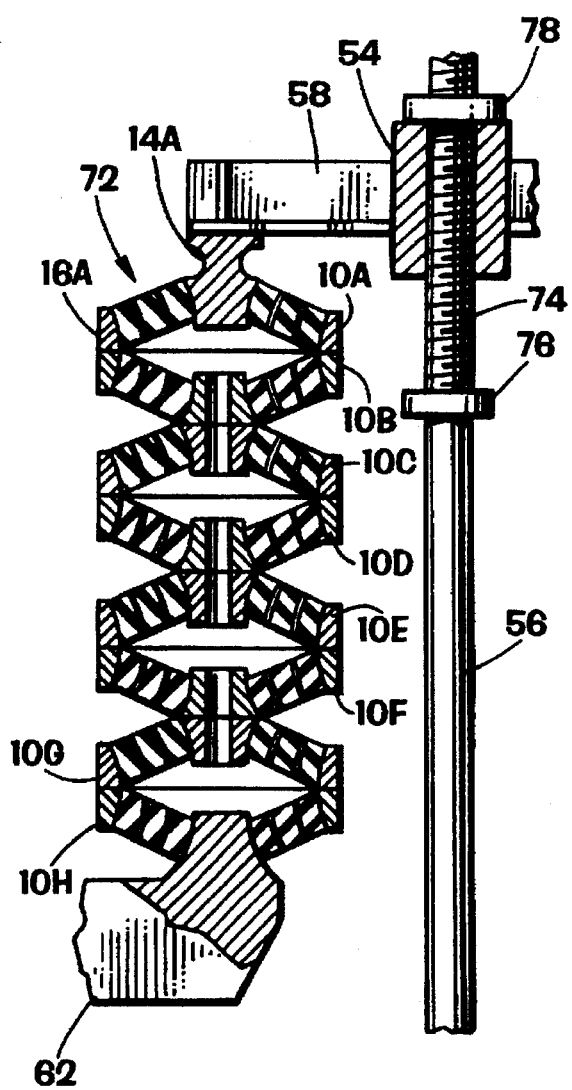
FIG. 15
FIG. 14

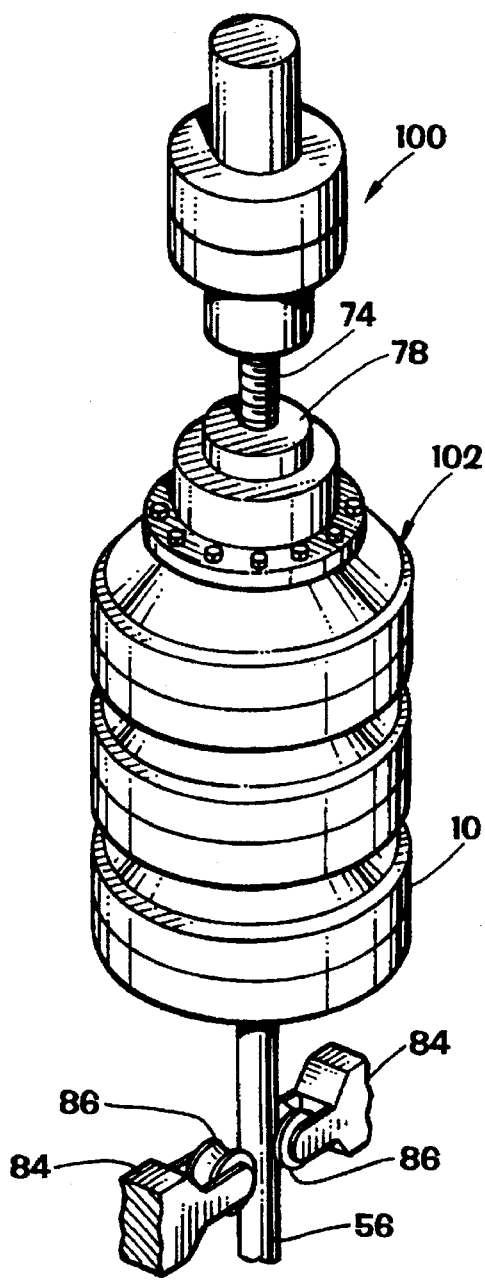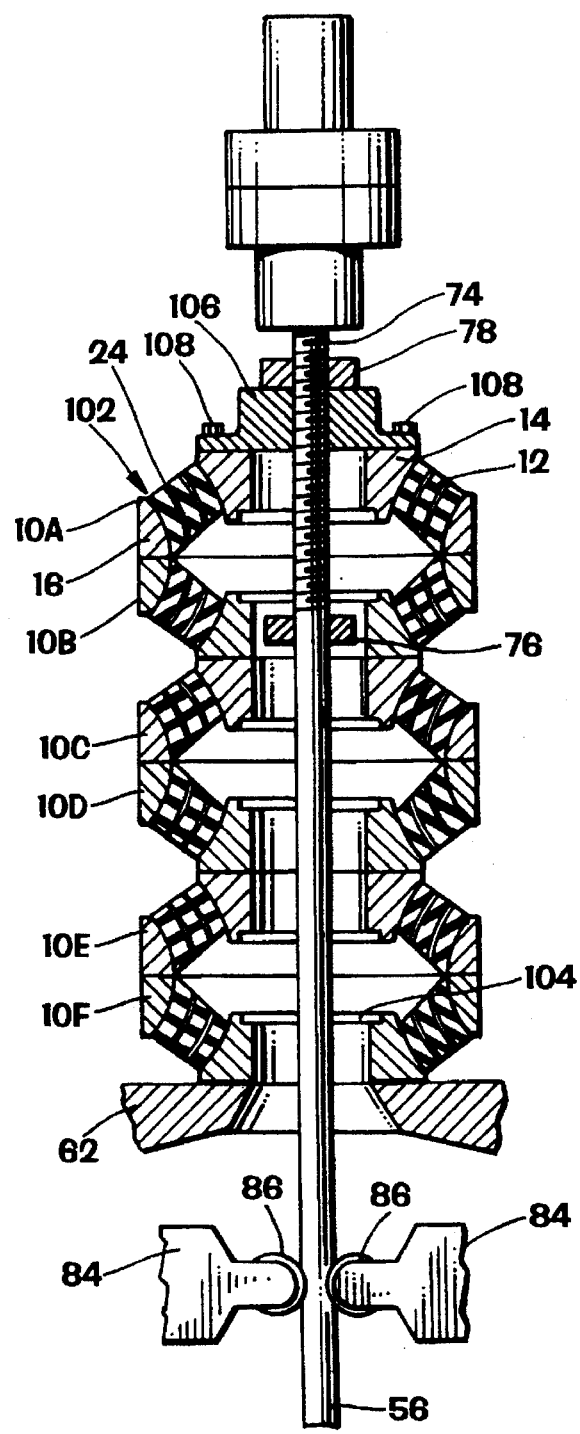

VARIABLE SPRING RATE COMPRESSION ELEMENT AND RISER TENSIONER SYSTEM USING THE SAME

CROSS-REFERENCE TO RELATED APPLICATIONS

This application is a continuation-in-part of application Ser. No. 08/047,810 filed Apr. 15, 1993.

BACKGROUND OF THE INVENTION

1. Field of the Invention

The present invention relates generally to riser tensioner systems for use on offshore platforms and, more particularly, to a variable spring rate compression element and a riser tensioner system that uses one or more of these elements to provide a variable spring rate to maintain a substantially constant upward force on a supported riser.

2. Description of Related Art

Increased oil consumption and rising oil prices have lead to exploration drilling and production in geographic locations that were previously considered to be economically unfeasible. As is to be expected, drilling and production under these difficult conditions leads to problems that are not present under more ideal conditions. For example, an increasing number of facilities are located in offshore locations in order to tap more oil and gas reservoirs. These exploratory wells are generally drilled and then brought into production from floating platforms that produce a set of problems peculiar to the offshore drilling and production environment.

Offshore drilling and production operations require the use of pipe strings that extend from equipment on the sea floor to the floating platform. These vertical pipe strings, typically called risers, convey materials and fluids from the sea floor to the platform, and vise versa, as the particular application requires. The lower end of the riser is connected to the well head assembly adjacent the ocean floor, and the upper end usually extends through a centrally located opening in the hull of the floating platform.

As drilling and production operations progress into deeper waters, the length of the riser increases. Consequently, its unsupported weight also increases. Structural failure of the riser may result if compressive stresses in the elements of the riser exceed the metallurgical limitations of the riser material. Therefore, mechanisms have been devised in order to avoid this type of riser failure.

In an effort to minimize the compressive stresses and to eliminate, or at least postpone, structural failure, buoyancy or ballasting elements are attached to the submerged portion of the riser. These elements are usually comprised of syntactic foam elements, or of individual buoyancy or ballasting tanks, coupled to the outer surface of the riser sections. Unlike the foam elements, the tanks are capable of being selectively inflated with air or ballasted with water by using the floating vessel's air compression equipment. These buoyancy devices create upwardly directed forces in the riser and, thereby, partially compensate for the compressive stresses created by the weight of the riser. However, experience shows that these types of buoyancy devices do not adequately compensate for the compressive stresses or for other forces experienced by the riser.

To further compensate for the potentially destructive forces that attack the riser, the floating vessels incorporate other systems. Because the riser is fixedly secured at its lower end to the well head assembly, the floating vessel will move relative to the upper end of the riser due to wind, wave, and tide oscillations normally encountered in the offshore drilling environment. Typically, lateral excursions of the drilling vessel are prevented by a system of mooring lines and anchors or by a system of dynamic positioning thrusters that maintain the vessel in a position over the subsea well head assembly. Such positioning systems compensate for normal current and wind loading, and they prevent riser separation due to the vessel being pushed away from the well head location. However, these positioning systems do not prevent the floating vessels from oscillating upwardly and downwardly due to wave and tide oscillations. Therefore, the riser tensioning systems on the vessels are primarily adapted to maintain an upward tension on the riser throughout the range of longitudinal oscillations of the floating vessel. This type of mechanism applies an upward force to the upper end of the riser, usually by means of a cable, a sheave, or a pneumatic or hydraulic cylinder connected between the vessel and the upper end of the riser.

However, hydraulic tensioning systems are large, heavy, and require extensive support equipment. Such support equipment may include compressors, hydraulic fluid, reservoirs, piping, valves, pumps, accumulators, electric power, and control systems. The complexity of these systems necessitate extensive and frequent maintenance which, of course, results in high operating costs. For instance, many riser tensioners incorporate hydraulic actuators which stroke up and down in response to movements of the floating vessel. These active systems require a continuous supply of high pressure fluids for operation. Thus, a malfunction could eliminate the supply of this high pressure fluid, causing the system to fail. Of course, failure of the tensioner could cause at least a portion of the riser to collapse.

In an effort to overcome these problems, tensioner systems have been developed which rely on elastomeric springs. The elastomeric riser tensioner systems provide ease of installation, require minimal maintenance, and offer simple designs with few moving parts. These springs operate passively in that they do not require a constant input energy from an external source such as a generator. Moreover, the elastomeric systems do not burden the floating platform with an abundance of peripheral equipment that hydraulic systems need in order to function.

The elastomeric devices operate in the shear mode, whereby the rubber-like springs are deformed in the shear direction to store energy. The shear mode of operation has numerous shortcomings. For example, in the shear mode, rubber exhibits poor fatigue characteristics, which can result in sudden catastrophic failure. When numerous rubber springs are combined in series, the reliability of the system quickly deteriorates because only one flaw in the elastomeric load path can very quickly lead to catastrophic failure of the entire system.

Moreover, an ideal tensioner system provides a constant tensioning force to support the riser. While some of the complicated hydraulic systems alluded to above can be controlled to provide a substantially constant force, the simpler elastomeric devices which overcome many of the problems of the hydraulic systems do not support the riser using a constant force. Thus, changes in the force exerted on the riser in response to longitudinal excursions of the platform produce undesirable tensile stress fluctuations in the riser. These fluctuations can substantially shorten the useable life of the riser. In addition, most currently available elastomeric systems are quite complex and, thus, quite expensive.

The present invention is directed to overcoming, or at least minimizing, one or more of the problems set forth above.

SUMMARY OF THE INVENTION

In accordance with one aspect of the present invention, there is provided a compression element that is deflectable along a longitudinal axis. The compression element includes an inner flange having a curved outer coupling portion and an outer flange having a curved inner coupling portion. A deflectable member with an axial spring rate that varies within a given range in response to axial movement of the member couples the inner flange to the outer flange in an axially spaced apart relationship. The deflectable member has a first curved end coupled to the curved outer coupling portion of the inner flange, and the deflectable member has a second curved end coupled to the curved inner coupling portion of the outer flange. At least one curved reinforcement is disposed in the deflectable member. The curved outer coupling portion, the curved inner coupling portion, and the curved reinforcement share a common focal point along a central cross-section. Relative axial movement of the inner flange toward the outer flange compresses the deflectable member and decreases the axial spring rate of the deflectable member.

In accordance with another aspect of the present invention, there is provided a riser tensioner system for applying a tensioning force to a riser and allowing a floating platform to move within a given range along a longitudinal axis of the riser. The system includes a compression element that is deflectable along the longitudinal axis. The compression element includes an inner flange having a curved outer coupling portion, and an outer flange having a curved inner coupling portion. A deflectable member having an axial spring rate that varies within a given range in response axial movement of the member couples the inner flange to the outer flange in an axially spaced apart relationship. The deflectable member has a first curved end coupled to the outer coupling portion of the inner flange, and the deflectable member has a second curved end coupled to the inner coupling portion of the outer flange. At least one curved reinforcement is disposed in the deflectable member. The curved outer coupling portion, the curved inner coupling portion, and the curved reinforcement share a common focal point along a central cross-section. The inner flange is coupled to the riser, and the outer flange is coupled to the platform. Relative axial movement of the inner flange toward the outer flange compresses the deflectable member and decreases the axial spring rate of the deflectable member such that the tensioning force remains substantially constant throughout the range.

In accordance with still another aspect of the present invention, there is provided a riser tensioner system for applying a tensioning force to a riser and allowing a floating platform to move within a given range along a longitudinal axis of the riser. The system includes a columnar stack of compression elements having a top compression element and a bottom compression element. The stack of compression elements is deflectable along a longitudinal axis. Each of the compression elements includes an inner flange having a curved outer coupling portion, and an outer flange having a curved inner coupling portion. A deflectable member having an axial spring rate that varies within a given range in response axial movement of the member couples the inner flange to the outer flange in an axially spaced apart relationship. The deflectable member has a first curved end coupled to the outer coupling portion of the inner flange, and the deflectable member has a second curved end coupled to the inner coupling portion of the outer flange. At least one curved reinforcement is disposed in the deflectable member. The curved outer coupling portion, the curved inner coupling portion, and the curved reinforcement share a common focal point along a central cross-section. The top compression element is coupled to the riser, and the bottom compression element is coupled to the platform. Relative axial movement of the inner flanges of the compression elements in the stack toward the respective outer flanges of the compression elements in the stack compresses the deflectable members of the compression elements in the stack and decreases the axial spring rate of each of the deflectable members such that the tensioning force remains substantially constant throughout the range.

In accordance with an even further aspect of the present invention, there is provided a riser tensioner system for applying a tensioning force to a riser and allowing a floating platform to move within a given range along a longitudinal axis of the riser. The system includes a support member that is coupled to the riser and which has a portion extending radially outwardly from the riser. The system also includes a plurality of columns of compression elements. Each column has an upper end portion that is coupled to the radially extending portion of the support member, and a lower end portion that is coupled to the platform. Each column is deflectable in response to certain relative movement between the riser and the platform along the longitudinal axis. Each column includes compression elements having an inner flange having a curved outer coupling portion, and an outer flange having a curved inner coupling portion. A deflectable member having an axial spring rate that varies within a given range in response axial movement of the member couples the inner flange to the outer flange in an axially spaced apart relationship. The deflectable member has a first curved end coupled to the outer coupling portion of the inner flange, and the deflectable member has a second curved end coupled to the inner coupling portion of the outer flange. At least one curved reinforcement is disposed in the deflectable member. The curved outer coupling portion, the curved inner coupling portion, and the curved reinforcement share a common focal point along a central cross-section. Relative movement of the platform toward the support member along the longitudinal axis of the riser produces relative axial movement of each of the inner flanges toward each of the outer flanges in each of the compression elements in each of the columns. Thus, this movement compresses each of the deflectable members and decreases the axial spring rate of each of the deflectable members such that the tensioning force remains substantially constant throughout the range.

BRIEF DESCRIPTION OF THE DRAWINGS

Advantages of the invention will become apparent upon reading the following detailed description and upon reference to the drawings in which:

FIG. 14 illustrates a perspective view of another embodiment of a riser tensioner system, in accordance with the present invention, having a plurality of columns of compression elements;

FIG. 15 illustrates a cross-sectional view of a column of compression elements illustrated in FIG. 14;

FIG. 18 illustrates a perspective view of a further embodiment of a riser tensioner system, in accordance with the present invention, having a single column of compression elements;

FIG. 19 illustrates a cross-sectional view of the column of compression elements illustrated in FIG. 18;

Figure 1:
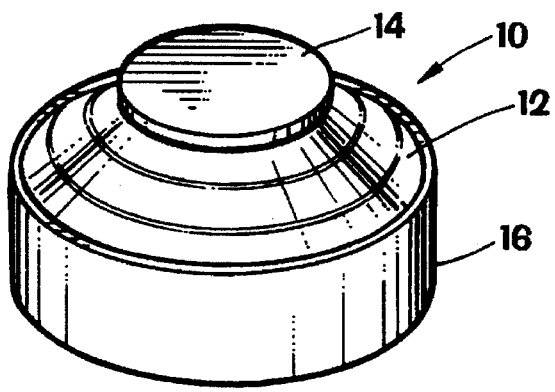
FIG. 1 illustrates a perspective view of a compression element in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

By utilizing the dynamic advantages afforded by elastomeric design concepts that continue to exploit the remarkable energy storage properties of elastomers, many new solutions to the present problems are possible. Because of the simplicity of the compression element, which is the basic component of the systems disclosed herein, there exists the potential to improve greatly the reliability, functional simplicity, and manufacturing and cost efficiency of riser tensioner systems as compared with prior riser tensioner systems, whether hydraulic or elastomeric. As will become apparent from studying this disclosure, the compression element permits the design and manufacture of simple, low cost, and highly reliable riser tensioner systems.

Before discussing the specific structures illustrated in the drawings, it should be noted that, by following the teachings disclosed herein, a wide variety of riser tensioner systems that maintain a substantially constant tensioning force may be designed. Indeed, several alternatives are described herein. Preferably, each system uses elastomeric elements that operate primarily in the compression mode. When such elements operate in the compression mode, they offer inherent advantages such as extremely long fatigue life and fail-safe operation. However, conventional compression-loaded elements tend to get stiffer as the element deflects. The force produced by a spring system as it deflects is given by the following equation:

$$F = x k_c \quad \text{(equation 1)}$$

where F equals the force applied to the spring, x equals the deflection of the spring, and $k_c$ equals the compression spring rate of the spring system. Therefore, for a tensioner system to maintain a substantially constant force on the riser as the platform moves, the collective spring rates of the tensioner devices vary inversely proportionally with respect to the deflection of the system as the system deflects. In other words, as the riser strokes and compresses the elements, the spring rate of the system becomes softer in accordance with the above equation.

U.S. Pat. No. 5,160,219, issued Nov. 3, 1992, and assigned to the same assignee, discloses various riser tensioner systems that maintain a substantially constant tensioning force on the riser. These systems use elastomeric elements that operate in the compression mode. Levers control the orientation of the elastomeric elements to vary a vertical component of the spring rate as the riser strokes. Although these systems operate quite well, they often use complex spring and lever assemblies. The devices disclosed herein offer the same benefits and advantages of the systems disclosed in U.S. Pat. No. 5,160,219, yet they facilitate the design of simpler riser tensioner systems, they are easily manufactured, and they are more easily controlled when installed on an offshore platform.

Turning now to the drawings and referring initially to FIG. 1, a preferred embodiment of a compression element is illustrated and generally designated by a reference numeral 10. The compression element 10 includes a deflectable member 12, an inner flange 14, and an outer flange 16. The deflectable member 12 is preferably a truncated, hollow, cone-shaped elastomeric molding. The inner and outer flanges 14 and 16 are preferably metal, but may also be made of a composite material. The inner diametric portion of the deflectable member 12 is coupled to an outer portion of the inner flange 14, and the outer diametric portion of the deflectable member 12 is coupled to an inner portion of the outer flange 16. In fact, the most preferable compression element 10 may be most accurately described as an elastomeric Belleville washer with a constrained outer periphery.

The flanges 14 and 16 and the deflectable member 12 are preferably molded. Those knowledgeable in mold design will realize that many design parameters should be considered, such as tolerances of the mold and metal insert interfaces, configuration and surface finish, elastomer shrinkage, and heat transfer. Finite element analysis is often useful for comparing predicted data with actual data from prototypes. From substantial experience in the development of procedures for large laminated elastomeric bearings, it should be noted that sub-scale efforts do not adequately duplicate the same process conditions as full-scale moldings. Thus, full-scale unbonded and semi-bonded prototypes are recommended before actual production begins.

The type of elastomer selected depends upon the characteristics required for a given application. Preferably, the raw elastomer, filler, and plasticizer are carefully selected, weighed, and mixed to form the desired compound, as is well known to those skilled in the art. The compound is then calendared on a roll to build up the flex elements prior to molding.

Preferably, the deflectable member 12 is permanently coupled to the metal flanges 14 and 16 using a vulcanized bonding process that is well-known in the art. The steel flanges 14 and 16 are first subjected to a rigorous cleaning that begins with an application of solvent to remove any packaging coating or contaminates remaining from the metal forming process. The steel components are then subjected to baking at 230 degrees Celsius for at least 48 hours to remove any oils or other contaminates detrimental to bonding. The components are then cleaned again with solvent and blasted to a white metal finish using aluminum oxide grit. Finally, the components are vapor degreased and power rinsed with virgin solvent.

Before the bonding agent is applied to the metal components, a primer, such as Chemlock 205 available from Lord Elastomer Products Corp., 2000 West Grand View Blvd., Erie, Pa. 16512, is applied to the bonding surfaces of the flanges 14 and 16. Then, the bonding agents, such as Chemlock 220 available from Lord, are continuously agitated to ensure adequate mixing and are applied to the flanges using a spray gun energized by a dried and filtered air supply. Each piece of elastomer is cut from the calendar roll and built up (preferably with reinforcements as will be described subsequently) and assembled into the mold. The assembled mold is transferred to a press for curing, as is well known to those skilled in the art.

Figure 2:
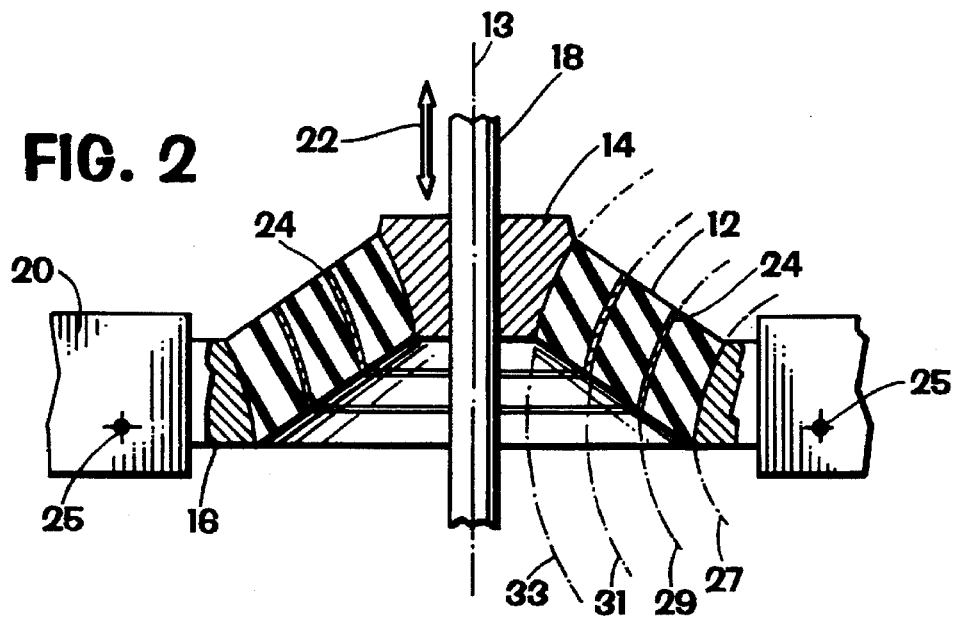
FIG. 2 illustrates a cross-sectional view of the compression element illustrated in FIG. 1.
Figure 3:
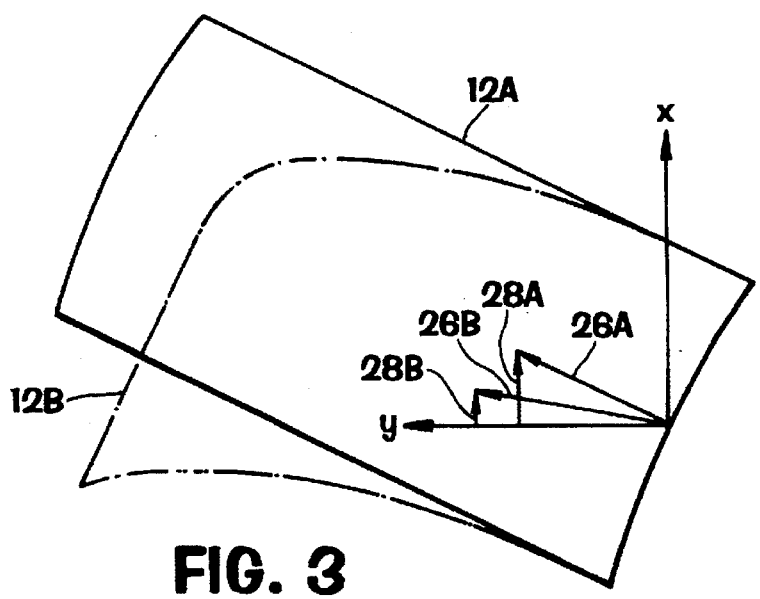
FIG. 3 illustrates a portion of the deflectable member of the compression element illustrated in FIG. 2 in its undeflected and deflected states.

When the deflectable member 12 is in its undeflected state, it axially separates the inner flange 14 from the outer flange 16, as illustrated in FIG. 2. In this state, the deflectable member 12 forms a given conical angle α between the longitudinal axis 13 of the compression element 10 and an "element" of the cone, which is one of the sloping sides of the deflectable member 12. When an axial load is applied to the compression element 10, the inner flange 14 moves closer to the outer flange 16, thus compressing the deflectable member 12 and increasing the conical angle α by "rotating" the deflectable member 12 into a more horizontal position. Actually, the load initially imposes some shear loading on the rubber, but it quickly reverts to a compression dominant mode as the deflectable member 12 rotates downward and compresses between the inner flange 14 and the outer flange 16. The compression and flattening of the deflectable member 12 is illustrated in FIG. 3 where the member 12A represents the deflectable member 12 in its undeflected state and the member 12B represents the deflectable member 12 in its fully deflected state.

It is easy to visualize that the deflectable member 12 compresses and becomes more horizontal as the inner flange 14 moves downwardly relative to the outer flange 16. However, what is not so easy to visualize is the affect that this movement has upon the axial spring rate of the deflectable member 12. As illustrated in FIG. 3, the vector 26A represents the spring rate of the deflectable member 12 when it is in its undeflected state, and the vector 26B represents the spring rate of the deflectable member 12 when it is in its fully deflected state. Notice that as the deflectable member 12 deflects, its spring rate vector 26 becomes more horizontal, moving from the position of the vector 26A to the position of the vector 26B. The rotation of the spring rate vector 26 causes the magnitude of the vertical component of the vector 26 to decrease, as can be seen by comparing the magnitudes of the vertical component vectors 28A and 28B. It should also be noted that the magnitude of the vector 26 increases slightly as the deflectable member 12 compresses. Thus, the magnitude of the vertical component vector 28B is slightly greater than it would be if the magnitude of the vector 26 remained constant during rotation.

Because the object of the compression element 10 is to keep the axial force substantially constant, the magnitude of the vertical component of the spring rate vector 28 must decrease as the axial deflection x of the deflectable member 12 increases. Using equation 1 and assuming linearity between the undeflected state and the fully deflected state we can see that:

$$F = x_1 \bar{k}_{c1} \qquad \text{(equation 2)}$$

$$F = x_2 \bar{k}_{c2} \qquad \text{(equation 3)}$$

$$x_1 \bar{k}_{c1} = x_2 \bar{k}_{c2} \qquad \text{(equation 4)}$$

$$\frac{x_1}{x_2} = \frac{\bar{k}_{c2}}{\bar{k}_{c1}} \qquad \text{(equation 5)}$$

where $x_1$ is the axial displacement of the deflectable member 12 in its undeflected state, $\bar{k}_{c1}$ is the vertical component of the spring rate of the deflectable member 12 in its undeflected state, $x_2$ is the axial displacement of the deflectable member 12 in its fully deflected state, and $\bar{k}_{c2}$ is the vertical component of the spring rate of the deflectable member 12 in its fully deflected state. Thus, as shown by equations 2–5, the change in the vertical component 28 of the spring rate vector 26 of the deflectable member 12 must change inversely proportionally with the change in axial displacement x of the deflectable member 12.

Figure 4:
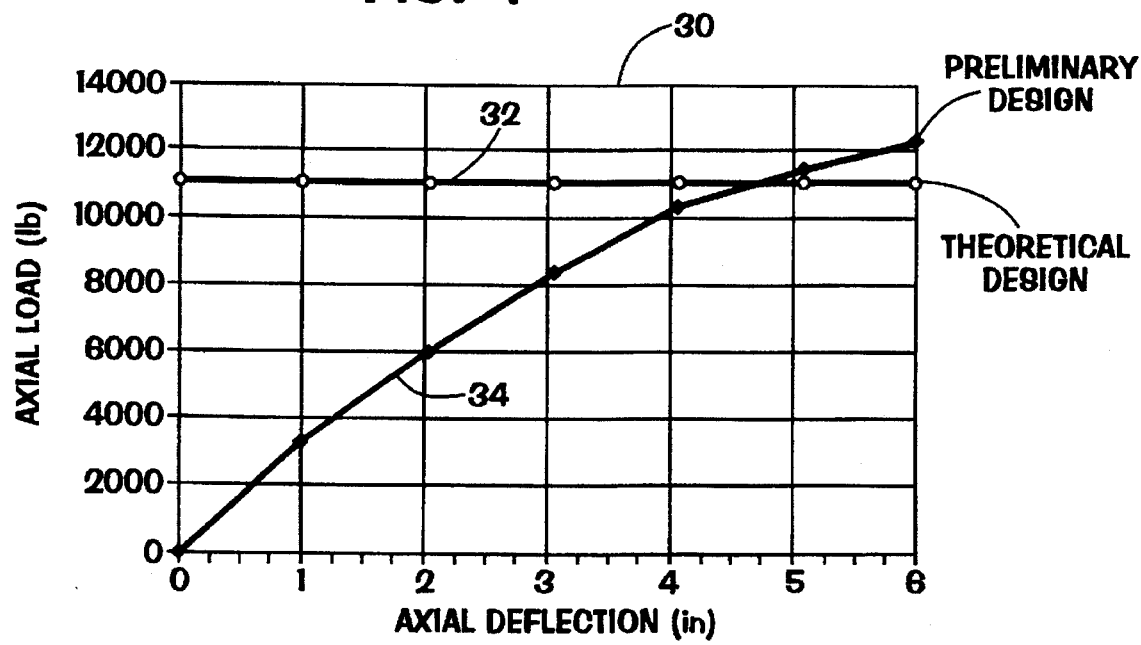
FIG. 4 is a graph of spring rate v. deflection for a compression element, such as the compression element illustrated in FIG. 1, where the compression element has no reinforcements.
Figure 5:
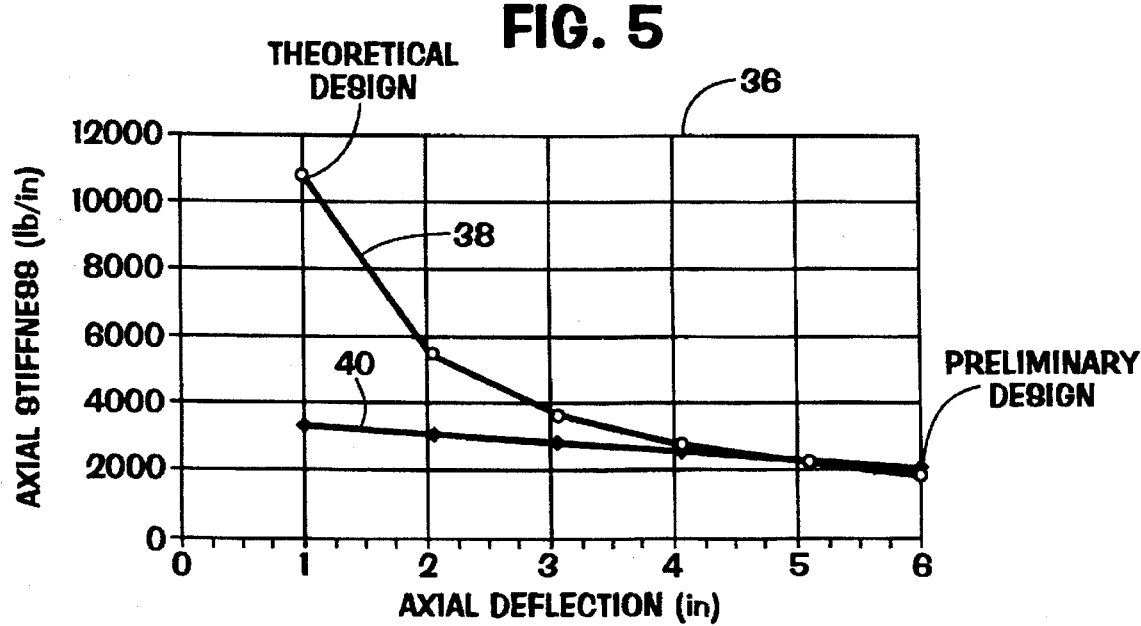
FIG. 5 is a graph of targeted and actual force v. deflection for a compression element, such as the compression element illustrated in FIG. 1, where the compression element has no reinforcements.

The application of equations 2–5 is illustrated in FIGS. 4 and 5. FIG. 4 illustrates a graph 30 of the axial load F versus the axial deflection x of a compression element 10. The curve 32 illustrates the theoretical design goal for a compression element 10, where the desired constant force is 11,000 pounds. For the particular force versus deflection illustrated by the curve 32 in FIG. 4, the curve 38 of the graph 36 illustrated in FIG. 5 describes the theoretically ideal decrease in axial stiffness, i.e., vertical spring rate, as the deflection x of the compression element 10 ranges from one inch to six inches. By plugging the data from the curves 32 and 38 into equation 1, one can readily see that the axial force remains constant if the magnitude of the vertical component of the spring rate changes in accordance with the curve 38.

However, it would be difficult to design a compression element 10 to maintain a constant axial force of 11,000 pounds over its entire deflection range, illustrated in the graphs 30 and 36 as being six inches. The curve 34 illustrates the actual force versus deflection characteristics of an early preliminary design of a compression element 10. Clearly, over the six inch range, the axial force is not substantially constant. However, over the deflection range of three to six inches, the curve 34 begins to level off and approximates the ideal curve 32. In other words, the slope of the curve 34 decreases between three inches and six inches of displacement. Similarly, the curve 40 illustrates the amount that the vertical component of the spring rate of the early preliminary design of the compression element 10 actually decreased over the deflection range of the compression element 10. It, too, closely approximates the ideal curve 38 as it reaches the operating range between three and six inches of deflection. Thus, the compression element 10 could be prestressed so that it operates in the deflection range of three to six inches, and the force within the operating range of the compression element 10 will vary between 8,000 and 12,000 pounds.

It should be emphasized that the curves 34 and 40 were produced using data from an early preliminary design. Although the early preliminary design did not mirror the theoretically ideal design, it did prove that the vertical component of the spring rate of the compression element 10 actually did decrease as its deflection increased. Thus, it proved that the concepts disclosed herein were viable. By following the teachings disclosed herein, one skilled in the art can properly select the parameters to produce a compression element 10 that provides an even more constant axial force within a given operating range.

By properly considering certain parameters, a compression element 10 can be designed to provide a substantially constant axial force for a predetermined range of deflection. Many parameters of the compression element 10 may be altered and chosen, depending on the desired application, to provide a substantially constant force to maintain substantially constant tension on a riser. For instance, the stiffness and the shape of the deflectable member 12 is chosen based upon the force that it is expected to experience during use, as well as the amount of deflection that it will experience as the riser strokes. Thus, the stiffness and compressibility of the deflectable member are largely determined by the choice of elastomeric material. The conical angle is also chosen, along with the shape and composition of the deflectable member 12, to provide the desired change in axial spring rate over the desired deflection range. The actual structure of the deflectable member 12 is also important, as will be explained in greater detail in reference to FIGS. 6–11.

In the most preferable embodiment, the deflectable member 12 is reinforced by one or more shims or reinforcements 24. The reinforcements 24 are preferably made of a composite or metal material. The reinforcements 24, and particularly the annular reinforcements used in a conically-shaped deflectable member 12, tend to stiffen the deflectable member 12. A deflectable member having reinforcements exhibits greater axial force and is more difficult to compress than one not having shims.

The shapes of the reinforcements, of the coupling portions of the inner and outer flanges 14 and 16, and of the inner and outer diametric portions of the deflectable member 12 will also influence the characteristics of the compression element 10. For instance, each of these surfaces may be straight, and the angles of these surfaces can be selected to achieve the desired characteristics, i.e., substantially constant force during deflection in a particular range. Preferably, however, the shapes of these elements are curved or spherical. In fact, these reinforcements are the reverse of the shape normally utilized for angular deflection. It has been found that spherical surfaces reduce the stress experienced by the compression element 10 as it deflects and causes the deflectable member 12 to "rotate" in a more controlled and linear manner. Therefore, the compression element becomes more stable, more predictable, and requires less material to handle the same amount of force.

As illustrated in FIG. 2, the outer diametric portion of the inner flange 14 and the outer diametric portion of the deflectable member 12 are concave. Similarly, the inner diametric portion of the outer flange 16 and the inner diametric portion of the deflectable member 12 are convex to compliment the concave surfaces of the members to which they are coupled. The reinforcements 24 illustrated in FIG. 2 may be curved in the same manner as the surfaces of the inner flange 14, the outer flange 16, and the deflectable member 12 to facilitate compression and rotation.

The curvature of the reinforcements 24 also affects the deflection characteristics of the compression element 10. In one embodiment, the reinforcements 24 and the surfaces of the inner flange 14, the outer flange 16, and the deflectable member 12 have the same curvature, which means that the focal point of each is the same distance from the respective surface. So constructed, the deflectable member 12 generally remains more linear as it "rotates" and, thus, remains more stable and predictable as compared with a deflectable member 12 have no shims or having straight shims.

In the most preferred embodiment, however, the reinforcements 24 and the surfaces of the inner flange 14, the outer flange 16, and the deflectable member 12 have the same focal point, illustrated by the focal points 25 in FIG. 2. In other words, a cross-section of each of these surfaces taken through the center of the compression element 10 may be thought of as a portion of a respective concentric circle 27, 29, 31, and 33 each having the same focal point 25, as illustrated in FIG. 2. Of course, since the compression element 10 shown in FIG. 2 is circular, the focal point 25 actually form a "ring" around the compression element 10. In this configuration, the deflectable member 12 exhibits almost perfect linearity as it rotates during compression.

It should be noted that if the curved reinforcements 24 illustrated in FIG. 2 are solid rings, the curved reinforcements 24 do not pivot about the focal points 25. Rather, the curved reinforcements 24 move linearly up and down along the longitudinal axis 13 of the compression element 10, as would cylindrical reinforcements. However, the curved reinforcements 24 provide a dynamic advantage as compared to straight cylindrical reinforcements. If the deflectable member 12 contained cylindrical reinforcements, the elastomeric material in the deflectable member 12 would not rotate linearly during deflection. Rather, the elastomeric material would deform in shear such that the elastomeric material would bow in an arc as the inner flange 14 moves closer to the outer flange 16. This result is avoided by using the curved bonding surfaces of the inner flange 14 and of the outer flange 16 along with the curved reinforcements 24. The curved surfaces force the elastomeric material in the deflectable member 12 to rotate as a uniform body or column, because the curved surfaces have a greater projected area of influence on the elastomeric material along the direction of deflection. As the inner flange 14 moves toward the outer flange 16, the elastomeric material compresses within the area between the curved surfaces to produce an increase in bulk loading as the deflectable member 12 rotates linearly from its initial unloaded position.

The use of slotted or segmented configurations of the deflectable member 12, either with or without reinforcing shims, also facilitates the tailoring of the dynamic characteristics of the compression element over a wide range of applications. FIGS. 6–11 illustrate various different embodiments that the compression element may take depending upon the application in which the compression element is to be used. To avoid confusion, the reference numerals previously used to describe the compression element 10 will be used to describe similar elements of the compression elements illustrated in FIGS. 6–11.

The slotted or segmented configurations include slotted or segmented deflectable members 12 and, possibly, segmented outer flanges 16. A slotted or segmented deflectable member 12 tends to act as multiple deflectable columns or springs arranged circumferentially around the inner flange 14, as contrasted with the deflectable "cone" represented by the solid circular configuration illustrated in FIGS. 1 and 2. Typically, the size and number of the segments or slots are chosen to vary the spring rate, to increase the range of deflection, or to reduce the axial force exerted by the compression element 10.

Figure 6:
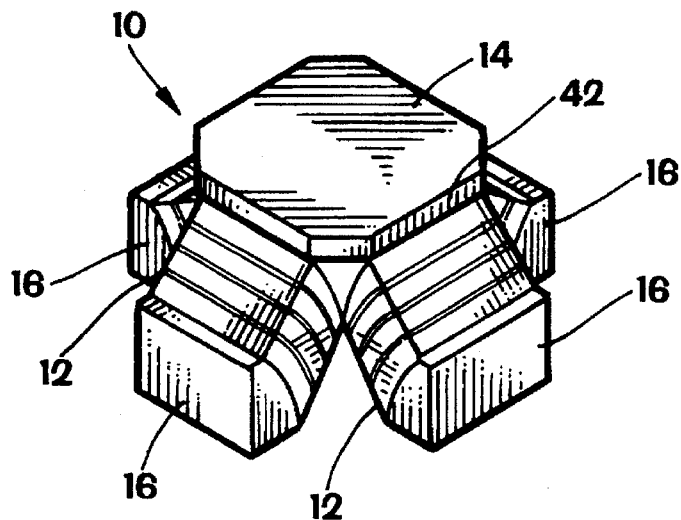
FIG. 6 illustrates a perspective view of another embodiment in accordance with the present invention having a square, segmented configuration.
Figure 7:
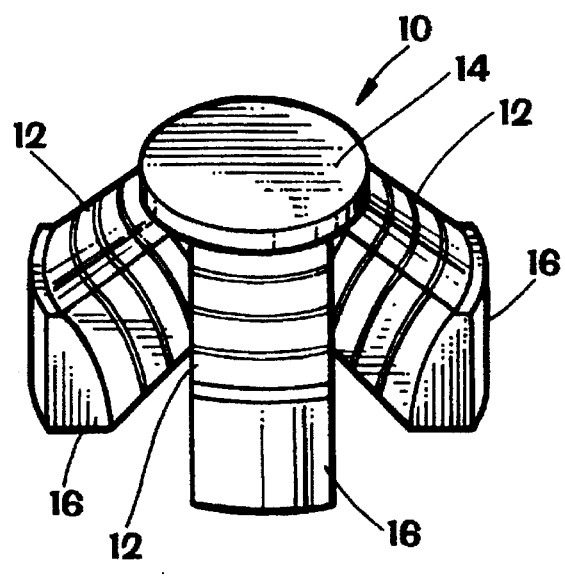
FIG. 7 illustrates a perspective view of another embodiment of a compression element, in accordance with the present invention, having a circular, segmented configuration.

The segmented configurations preferably use separate members as the deflectable member 12. FIG. 6 illustrates a compression element 10 having a square, segmented configuration. In this embodiment, the inner flange 14 is square or rectangular having four elongated sides 42. One end of a deflectable member 12 is coupled to each of the sides 42 at a given angle that corresponds to the conical angle α described earlier. The other end of each of the deflectable elements 12 is coupled to a segment of an outer flange 16. FIG. 7 illustrates a compression element 10 having a circular, segmented configuration. The circular segmented compression element 10 includes a circular inner flange 14 much like the inner flange 14 illustrated in FIGS. 1 and 2. One end of a plurality of deflectable members 12 is coupled to the inner flange 14 at a given angle. The other end of the plurality of deflectable members 12 is coupled to a segment of an outer flange 16.

Figure 8:
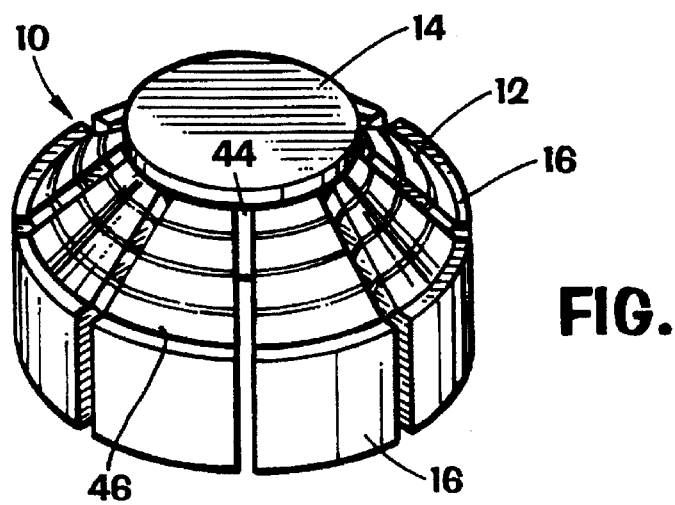
FIG. 8 illustrates a perspective view of still another embodiment of a compression element, in accordance with the present invention, having a circular, slotted configuration.
Figure 9:
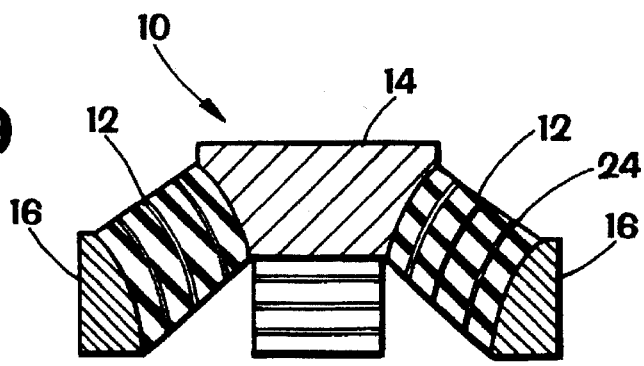
FIG. 9 illustrates a cross-sectional view of a compression element as illustrated in FIGS. 6, 7, and 8.

In contrast to the embodiments that utilize a segmented deflectable member, FIG. 8 illustrates a compression element 10 having a circular slotted configuration. In this embodiment, a one-piece, and generally conical, deflectable member 12 is coupled to an inner flange 14. The deflectable member 12 is slotted so that the deflectable member 12 has a center hub 44 with outwardly extending spokes 46. The radially outer end of each of the spokes 46 is coupled to a segment of an outer flange 16. FIG. 9 illustrates a cross-sectional view of the compression elements 10 illustrated in FIGS. 6, 7, and 8. It should be noticed that the segmented and slotted configurations also preferably use the spherical concave and convex surfaces for the deflectable members 12, inner flanges 14, and segments of the outer flanges 16. Furthermore, the reinforcements 24 may be used as mentioned previously.

In the most preferred embodiment, the curved reinforcements 24 and the curved surfaces of the inner flange, the outer flange 16, and the elastomeric material of the deflectable member 12 have the same focal point, as discussed with reference to FIG. 2. The same advantages discussed previously with regard to a solid conical deflectable member 12 apply to a slotted or segmented deflectable member 12. However, in the most preferred slotted or segmented embodiment, the slotted or segmented deflectable member 12 may exhibit even greater stability as it deflects because the curved reinforcements 24 are also segmented. Thus, unlike the solid rings discussed previously, the segmented curved reinforcements are not constrained to move linearly along the longitudinal axis 13 as the inner flange 14 moves toward the outer flange 16. Rather, the segmented curved reinforcements may rotate about their respective focal points. Thus, the segmented or slotted deflectable members 12 remain substantially linear during deflection because the elastomeric material in the deflectable member 12 and the curved reinforcements 24 essentially rotate about the same pivot point, i.e., the focal points.

Figure 10:
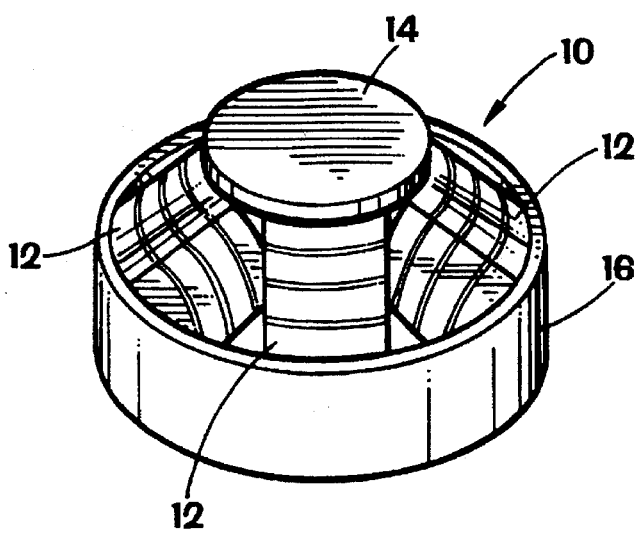
FIG. 10 illustrates a perspective view of yet another embodiment of a compression element, in accordance with the present invention, having a circular segmented configuration with a continuous outer flange.
Figure 11:
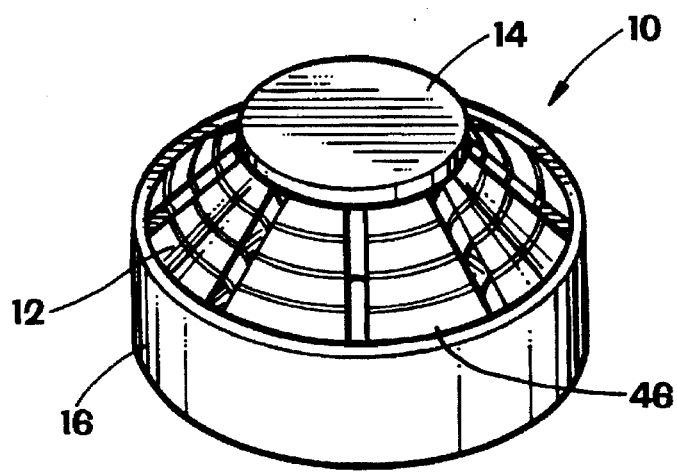
FIG. 11 illustrates a perspective view of a further embodiment of a compression element, in accordance with the present invention, having a circular slotted configuration with a continuous outer flange.

A compression element may also be made using a segmented or slotted deflectable member 12 and a continuous outer flange. FIG. 10 illustrates a compression element 10 having a segmented configuration with a continuous outer flange. The segments of the deflectable member 12 are similar to those used in the embodiment illustrated in FIG. 7. However, rather than being coupled to a segment of an outer flange, they are coupled to a continuous outer flange 16, such as that used in the compression element 10 illustrated in FIG. 1. Similarly, FIG. 11 illustrates a compression element 10 having a circular slotted configuration with a continuous outer flange 16. The deflectable member 12 is similar to the deflectable member illustrated in FIG. 8. However, instead of having the spokes of the deflectable member 12 coupled to a segment of an outer flange, the ends of the spokes 46 are coupled to a continuous outer flange 16.

A compression element 10, such as the ones disclosed above, may be used alone or in combination with other deflectable elements as a counter-balancing device, a load and motion compensation device, or a riser tensioner device. FIG. 2 illustrates the compression element 10 being used alone in a riser tensioner system. The inner flange 14 is coupled to a riser 18, and the outer flange 16 is coupled to a floating platform 20. As the platform 20 moves relative to the riser 18 in response to the motion of the water, the compression element 10 deflects axially, generally in the direction of the double-headed arrow 22. Thus, the compression element 10 allows the platform 20 to move in an axial direction relative to the riser 18. The range of movement of the platform 20 with respect to the riser 18 is commonly referred to as the "riser stroke." More specifically, the riser stroke includes an "up stroke" and a "down stroke." The up stroke occurs when the top of the riser moves up relative to the platform, and the down stroke occurs when the top of the riser moves down relative to the platform. Ideally, the compression element 10 minimizes the compressive stresses in the riser 18 as the riser 18 strokes by applying a substantially constant force to maintain tension on the riser 18. Therefore, the axial spring rate increases during upstroke and decreases during down stroke. A compression element, such as that illustrated in FIG. 2, may have an outer flange 16 having a diameter of 36 inches, an inner flange 14 having a diameter of 9 inches, and a height of 13 inches.

Although a single compression element 10 may be used alone as a riser tensioner, in most applications it is desirable to use a plurality of compression elements 10 in a riser tensioner system. It should be remembered that one goal in the design of a riser tensioner system is to design a system that maintains a substantially constant force on the riser as it strokes.

Figure 12:
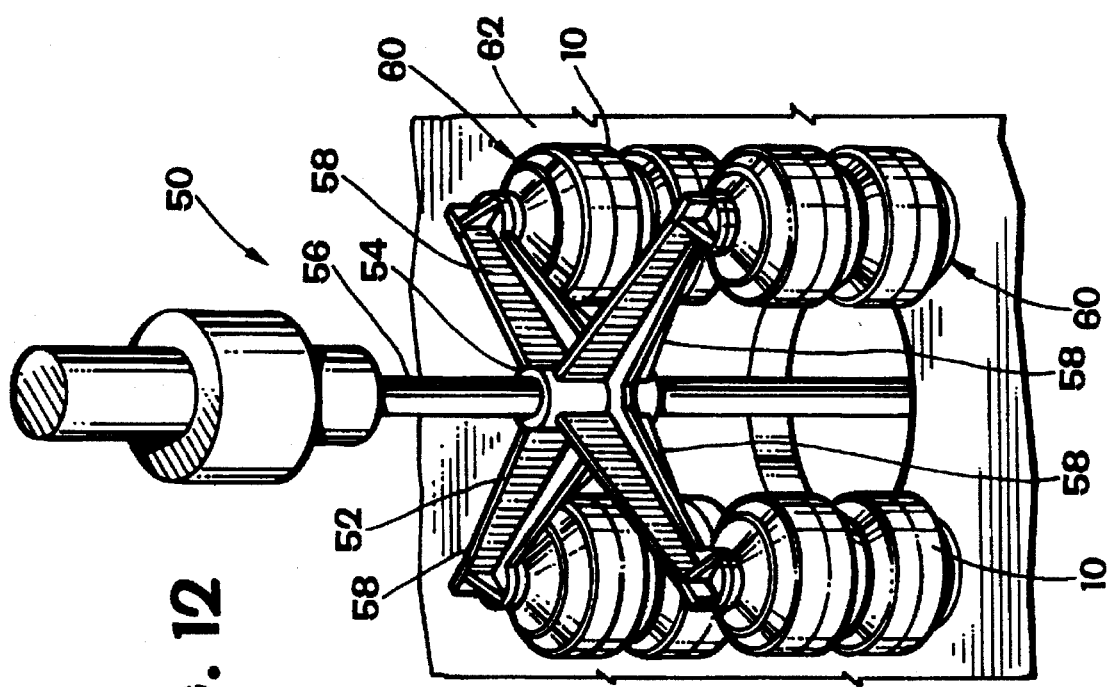
FIG. 12 illustrates a perspective view of a riser tensioner system having multiple columns of compression elements in accordance with the present invention.

One preferred embodiment of a riser tensioner system that incorporates a plurality of compression elements 10 is illustrated in FIG. 12 and generally designated by the reference numeral 50. The riser tensioner system 50 includes a support member 52 having a central hub 54 that is coupled to a riser 56 and four radially extending arms 58, the ends of which are coupled to the top of a stack or column 60 of compression elements 10. The bottom of each column 60 is coupled to a floating platform 62. As the platform 62 moves upwardly, the columns 60 of the compression elements 10 compress. As illustrated, four compression elements 10 are used to form each column 60. Thus, if each compression element has a deflection range of one foot when used in the system 50, each column 60 has a deflection range of four feet.

It should also be noted that each column 60 is preferably placed in deflection when the system 50 is installed. As described earlier, because each compression element 10 may only exhibit a substantially constant axial force over a given portion of its deflection range, it is often desirable to preload the compression element 10 so that it operates only within the given portion of its deflection range. The manner in which this preloading takes place will be described in detail with reference to FIGS. 14 and 15, but it should be understood that the system 50 may include a means for preloading the compression elements 10 in the columns 60. Furthermore, a metal shroud (not shown) may be placed around the columns for fire protection.

Figure 13:
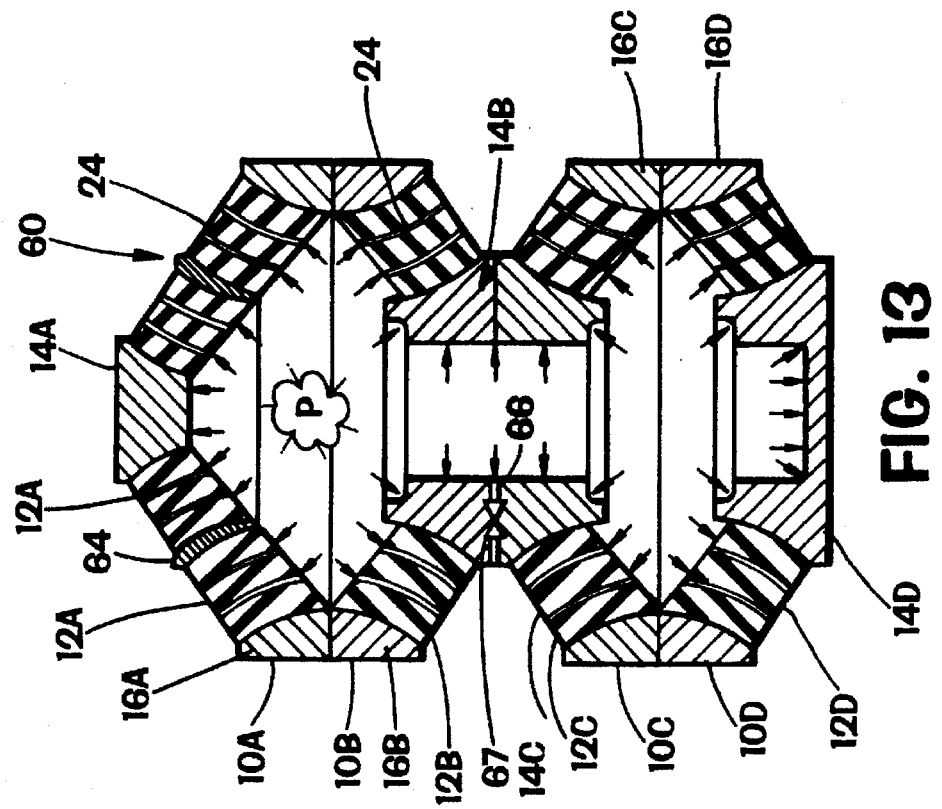
FIG. 13 illustrates a cross-sectional view of a column of compression elements illustrated in FIG. 12.

The compression elements 10 that make up the column 60 are slightly different from the compression elements illustrated in the previous figures. As illustrated in FIG. 13, each compression element 10 includes a solid conical deflectable member 12 having annular reinforcements 24. However, it should be noted that the top compression element 10a in the column 60 includes two conical deflectable members 12 that are coupled together by a large circular flange 64. The upper compression element 10a includes an inner flange 14a similar to the inner flange 14 described with reference to FIG. 1. Each of the compression elements 10a, 10b, 10c, and 10d include a solid outer flange 16a, 16b, 16c, and 16d, such as that described with reference to FIG. 1. However, the inner flanges of the middle and lower compression elements 10b, 10c, and 10d differ from the inner flanges previously described. The two inner flanges 14b and 14c of the middle compression elements 10b and 10c are formed as rings so that an aperture is formed within the interior of the column 60 when the rings are coupled together. The inner flange 14d of the lower compression element 10d is closed, but has a larger diameter than the inner flange 14a of the upper compression element 10a to provide a wide base on which the column 60 stands. Each compression element is coupled to another by a suitable means, such as by welding or bolting the flanges together.

Although the compression elements 10a, 10b, 10c, and 10d are designed with the previously mentioned parameters in mind so that the riser tensioner system 50 maintains a substantially constant force on the riser 56 as the riser 56 strokes, the construction of the column 60 offers an additional way to further flatten the force versus deflection curve of the column 60. Pneumatic pressurization of the internal envelope of a series or column of compression elements 10 makes the column more difficult to compress and, thus, modifies the dynamic response characteristics of a tensioner system using such a pressurized column. This introduces an additional parameter that may be set to achieve the desired deflection and force characteristics. Because of the design of the inner flanges 14b and 14c of the two middle compression elements 10b and 10c, the interior chamber formed within the column 60 may be pressurized with a compressible gas to further alter and fine tune the spring rate of the column 60. Preferably, the gas is inserted through an orifice 66 that is formed between the inner flanges 14b and 14c when the column 60 is constructed. The orifice 66 contains a valve 67 to permit the charging and discharging of the gas. Thus, when the riser tensioning system 50 is being installed on a platform, the pressure in the columns 60 can be regulated to produce a more ideal and customized riser tensioning system for the particular application.

An alternate embodiment of a riser tensioning system is illustrated in FIGS. 14 and 15, where the system is generally designated by a reference numeral 70. Like the riser tensioning system 50 illustrated in FIGS. 12 and 13, the riser tensioning system 70 includes a support member 52 having a hub 54 that is coupled to a riser 56. The support member 52 includes four radially extending arms 58, the end of each arm 58 being coupled to the top of a column 72 of compression elements 10. The bottom of each column 72 is coupled to a coupling member 62 of a floating platform. As the platform 62 moves upwardly, the columns 72 of the compression elements 10 compress and maintain a tensioning force on the riser 56.

The compression elements 10 in each column 72 are preferably placed in compression by preloading each column 72. Thus, in the "undeflected" state of the system 70, the compression elements 10 in each column 72 are actually deflected or compressed. Preferably, the compression elements 10 are deflected by the amount of axial displacement x necessary to put the compression elements 10 into the lower end of their preferred operating range, i.e., the range in which they provide a substantially constant axial force during deflection.

To preload the columns 72, the riser 56 includes a threaded portion 74 that is terminated at its lower end by a stop flange 76. The hub 54 of the support member 52 includes an internal threaded portion so that the support member 52 can be threaded onto the threaded portion 74 of the riser 56. The further down the threaded portion 74 the support member 52 is moved, the higher the preload on the columns 72. When the desired preload is reached, a locking nut 78 is threaded onto the threaded portion 74 until it is coupled tightly against the upper surface of the hub 54. The locking nut 78 locks the support member 52 into position relative to the threaded portion 74 of the riser 56.

The interior of a column 72 is illustrated by the cross-sectional view of FIG. 15. The column 72 is similar to the column 60 of FIG. 13, except that it includes eight compression elements 10 rather than four. It should be noted that the inner flange 14A of the upper compression element 10A in column 72 is "rigidly" coupled to the bottom of the support arm 58. The coupling between the support arm 58 and the platform 62 is not rigid, of course, due to the flexible compression elements 10.

Figure 16:
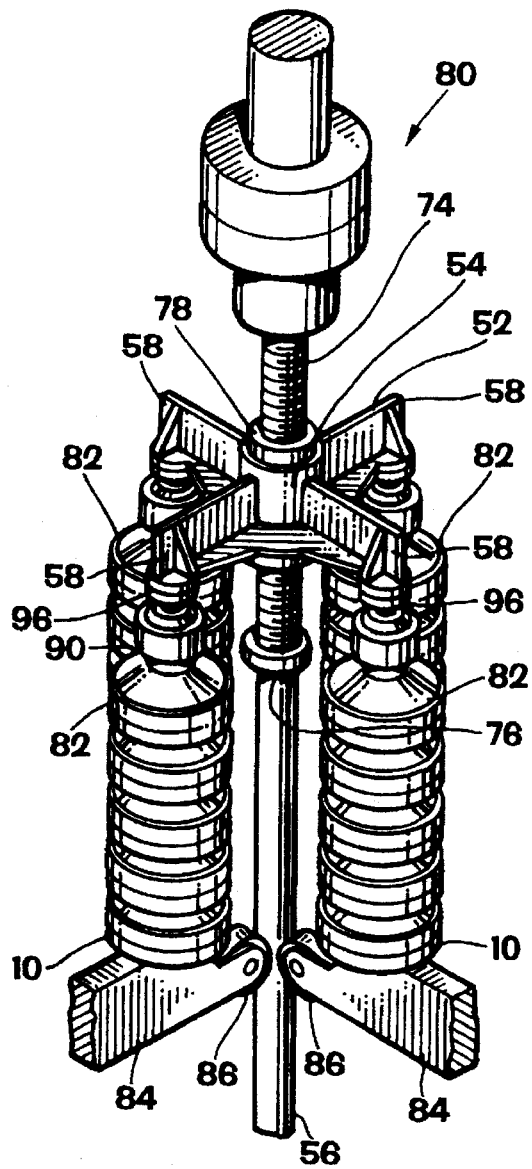
FIG. 16 illustrates a perspective view of yet another embodiment of a riser tensioner system, in accordance with the present invention, having a plurality of columns of compression elements.

In contrast to the riser tensioner system 70, a slightly different embodiment of a riser tensioner system is illustrated in FIG. 16 and generally designated by a reference numeral 80. The system 80 is virtually identical to the system 70, except the system 80 uses ten compression elements 10 in its columns 82. Also like the system 70, the bottom of each of the columns 82 is coupled to a coupling member 84 of a floating platform. However, the end of each coupling member 84 includes a guide roller 86 that rides along the riser 56 as the platform moves axially relative to the riser 56. Preferably, each guide roller 86 has a curved outer periphery so that it substantially matches the curvature of the riser 56. The guide rollers 86 maintain the riser 56 in a substantially parallel relationship with each of the columns 82. By preventing the riser 56 from becoming skewed with respect to the columns 82, the columns 82 are subjected to less stress, because the platform, not the columns 82, absorbs non-axial loads caused by the drifting of the platform with respect to the riser.

Figure 17:
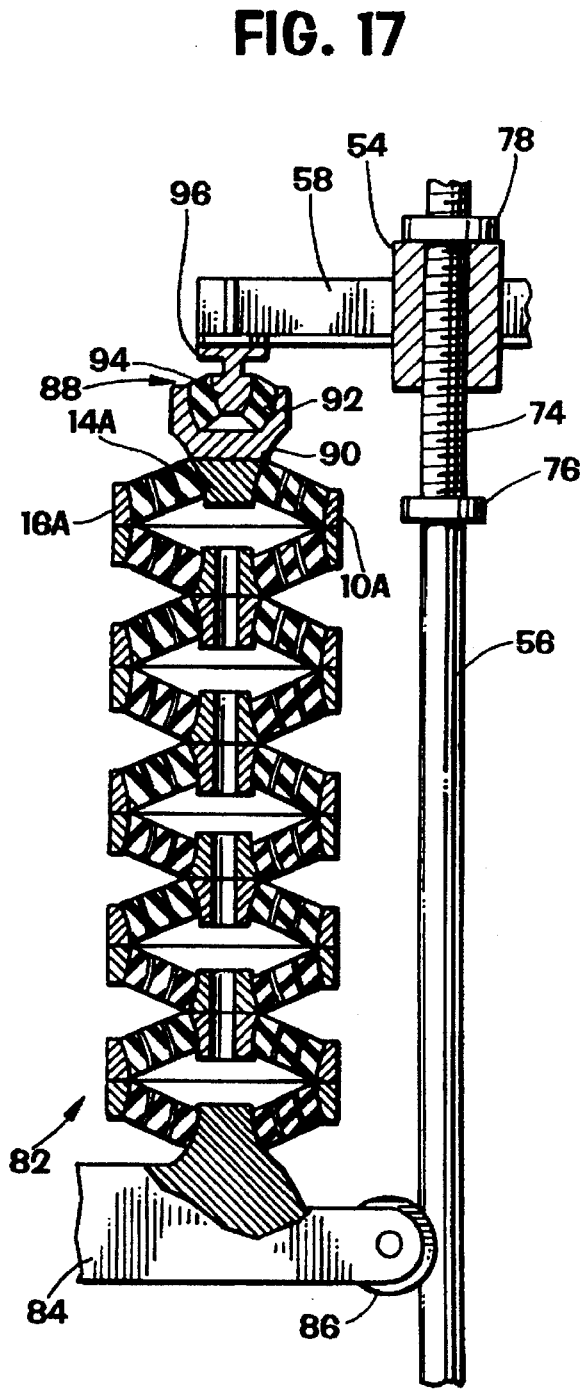
FIG. 17 illustrates a cross-sectional view of a column of compression elements illustrated in FIG. 16.

To minimize further the non-axial stress on the columns 82, each column 82 may be coupled to its support arm 58 by a flexible joint 88, as illustrated in FIG. 17. The flexible joint 88 operates much like a ball and socket joint. The flexible joint 88 includes a socket 90 that is coupled to the inner flange 14A of the upper compression element 10A in each column 82. Elastomeric material 92 resides within the socket 90 and couples a ball 94 to the socket 90. The ball 94 has an upwardly extending coupling portion 96 that is coupled to the bottom of its respective support arm 58. Thus, if the riser 56 pivots or becomes skewed with respect to a column 82, it pivots partially about the flexible joint 88 to reduce the stress on the compression elements 10 in the column 82.

A column of compression elements 10, similar to the columns illustrated in FIGS. 12–17, may also be used alone in a riser tensioner system. FIGS. 18 and 19 illustrate a riser tensioner system 100 that uses a single column 102 of compression elements 10. The system 100 can be considered a hybrid of the single element system illustrated in FIG. 2 and the systems 50, 70, and 80, because the system 100 uses a column of compression elements 10 that are concentrically disposed about the riser 56.

The compression elements 10 that make up the column 100 are slightly different from the compression elements illustrated in the previous figures. As illustrated in FIG. 19, each compression element 10 includes a solid conical deflectable member 12 having reinforcing shims 24. Each of the compression elements 10 also include a solid outer flange 16, such as that described with reference to FIG. 1. However, it should be noted that the inner flange 14 of each compression element 10 in the column 100 is an annular ring rather than a circular solid. The inner diameter of each inner flange 14 is preferably larger than the outer diameter of the largest riser to which the compression elements 10 might be coupled. When the system 100 is assembled and coupled to the riser 56, an annular insert 104 is coupled to each inner flange 14. This construction allows a manufacturer to vary the size of the apertures in the annular inserts 104 rather than the size of the flanges 14 and 16 of the compression elements 10. Each insert has an aperture that is larger than the outer diameter of the riser 56, so that each compression element 10 will slide axially along the riser 56 as the riser strokes. The size of the aperture is preferably only slightly larger, however, to prevent the column 102 from skewing as the riser strokes.

To further reduce skewing, the system 100 includes a platform 62 that has at least two coupling members 84 that have guide rollers 86, such as those discussed in reference to FIGS. 16 and 17. The coupling members 84 and rollers 86 preferably contact the riser 56 beneath the platform 62 to maintain the column 102 in an axial relationship with the riser 56. However, the guide mechanism may also be disposed inside the column or above it.

Also, like the systems 70 and 80 discussed previously, the system 100 includes a means for preloading the compression elements 10 in the column 102. The inner flange 14 of the upper compression element 10A is coupled to an internally threaded flange 106 by bolts 108. The flange 106 is threaded onto the threaded portion 74 of the riser 56. The further down the threaded portion 74 the flange 106 is moved, the higher the preload on the column 102. When the desired preload is reached, a locking nut 78 is threaded onto the threaded portion 74 until is coupled tightly against the upper surface of the flange 106. The locking nut 78 locks the flange 106 into position relative to the threaded portion 74 of the riser 56. It should also be noted that the annular insert 104 of the second compression element 10B is disposed above the stop flange 76. The stop flange 76 limits the amount of preload that can be applied to the column 102, because once the insert 104 contacts the stop flange 76 the preload on the lower compression elements 10C, 10D, 10E, and 10F does not increase. The stop flange 76 also limits the range of deflection of at least the compression elements 10B and 10C. The stop flange 76 may be positioned elsewhere in the column 102, as the particular application dictates, or it may be excluded from the system 102 entirely.

Figure 20:
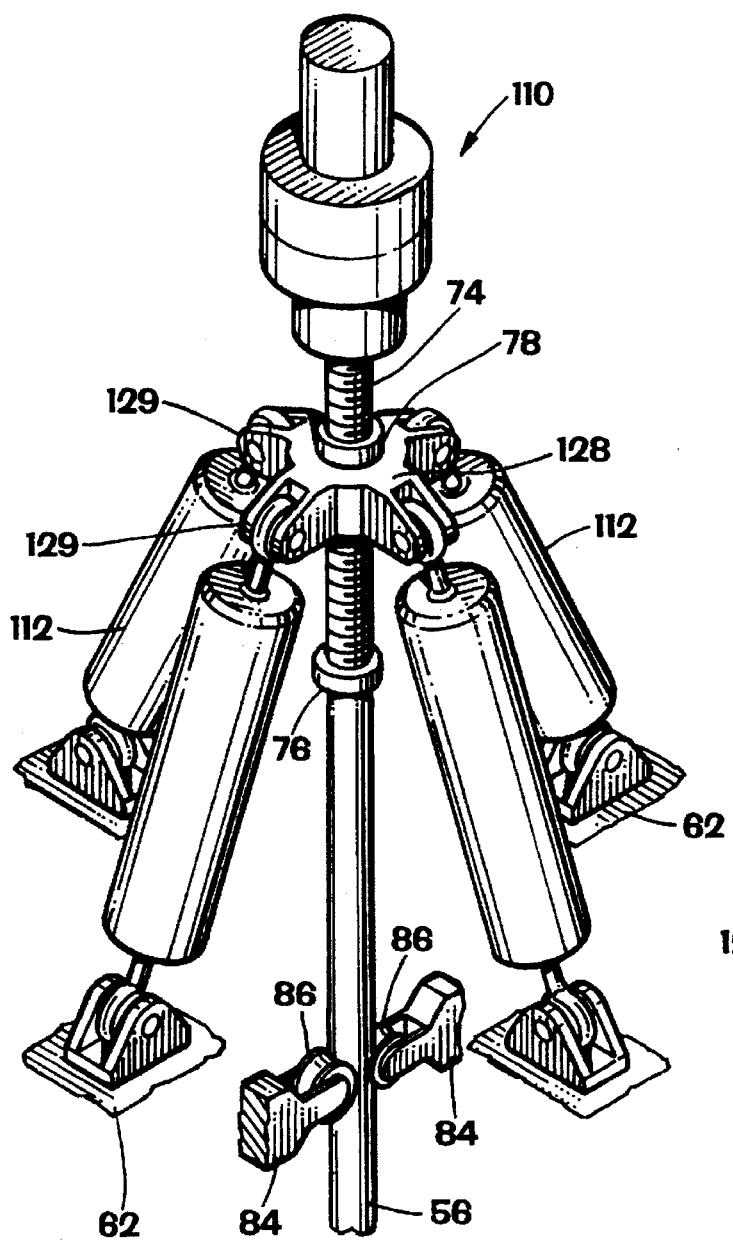
FIG. 20 illustrates a perspective view of a yet further embodiment of a riser tensioner system, in accordance with the present invention, having a plurality of columns of compression elements in strut-like casings.
Figure 21:
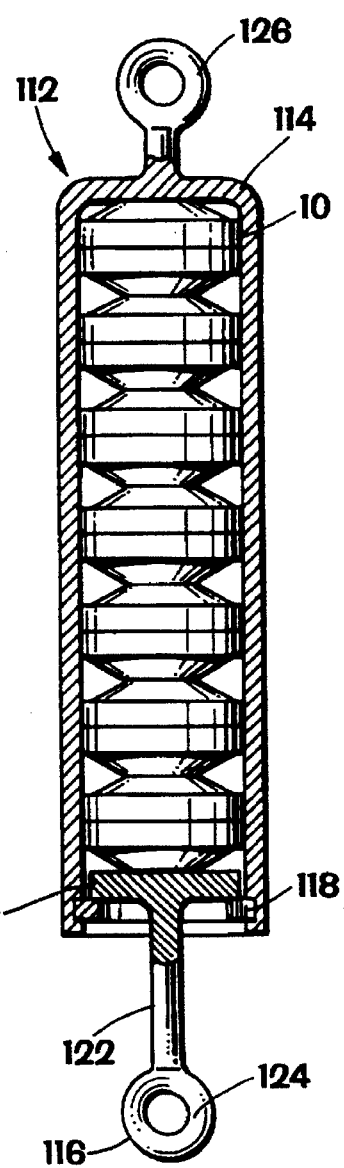
FIG. 21 illustrates a cross-sectional view of a column of compression elements in a strut-like casing illustrated in FIG. 20.
Figure 22:
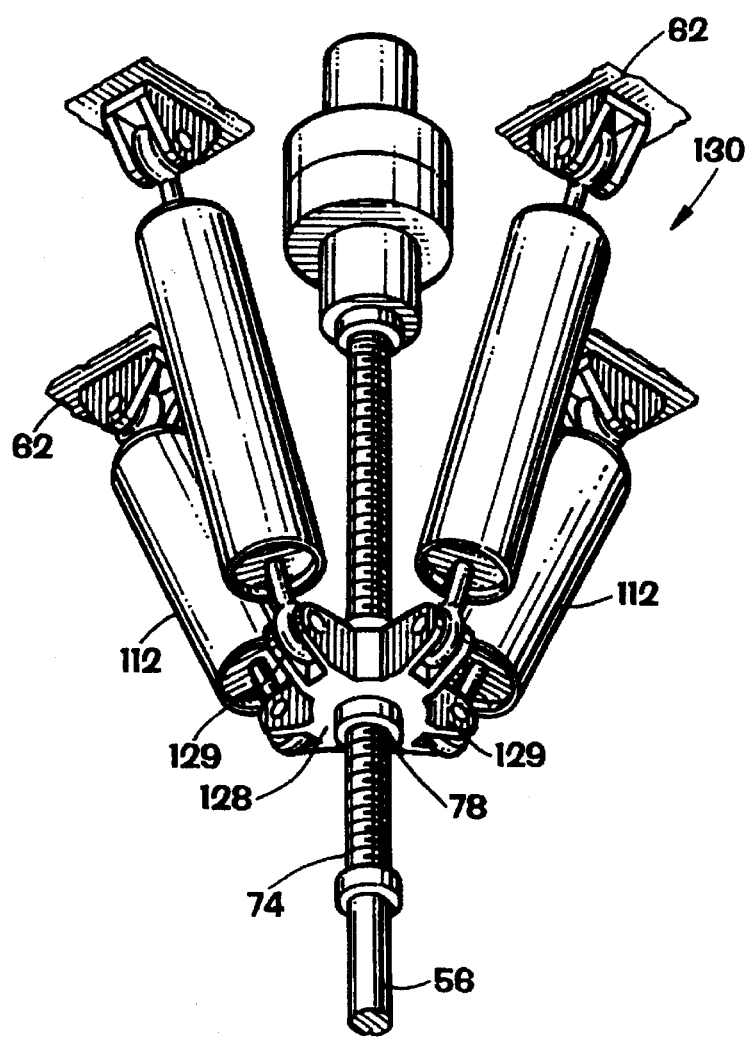
FIG. 22 illustrates a perspective view of a still further embodiment of a riser tensioner system, in accordance with the present invention, having a plurality of columns of compression elements in strut-like casings.

Although the systems described above have used compression elements that were coupled together by welding or bolting their flanges together, for instance, the compression elements may be coupled together in other fashions to create a column of compression elements. FIGS. 20 and 22 illustrate riser tensioner systems 110 and 130, respectively, that use columns 112 of compression elements 10 that are formed by enclosing a plurality of compression elements 10 in a strut-like casing 114. As illustrated in FIG. 21, after the desired number of compression elements 10 have been loaded into the casing 114, each compression element opposing the other, a plunger 116 is secured within the casing 114 by a locking member 118. The locking member 118 preferably screws into the casing 114 to prestress the compression elements 10, or the locking member 118 may take the form of a snap ring and snap into one of a plurality of longitudinally space slots in the casing 114. It should also be noted that the system 110 includes a means for preloading the compression elements 10 that may be used alone or in conjunction with the locking ring 118 to preload the compression elements 10.

The plunger 116 preferably includes a large circular portion 120 that fits within the casing 114 to urge the compression elements 10 axially. A rod portion 122 couples the large circular portion 120 to a termination 124 that is preferably configured to pivotally couple the plunger 116 to the riser or to the platform. The opposite end of the casing 114 also preferably includes a coupling member 126 that is configured to pivotally couple the casing 114 to the riser or to the platform. In addition, the casing 114 may be pressurized to alter the characteristics of the compression elements as discussed previously.

As illustrated in FIGS. 20 and 21, the column 112 is coupled between the riser 56 and the platform 62 so that relative movement between the riser 56 and the platform 62 causes the plunger 116 to move toward the coupling member 126 and, thus, compress the compression elements 10 within the casing 114. The coupling member 126 of casing 114 is pivotally coupled to the riser 56 via a hub 128 having a plurality of radially extending pivotal coupling members 129, and the termination 124 of each plunger 116 is pivotally coupled to the top of the platform 62.

Figure 23:
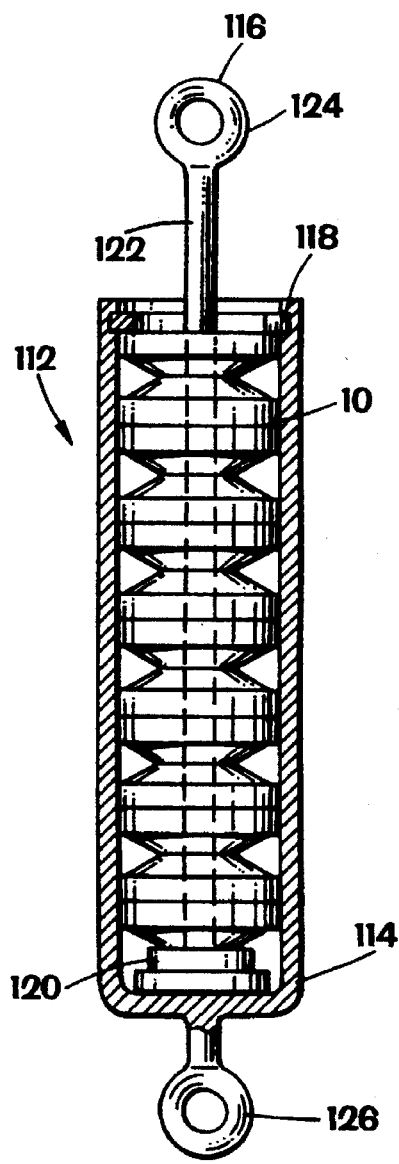
FIG. 23 illustrates a cross-sectional view of a column of compression elements in a strut-like casing illustrated in FIG. 22.

Although the system 110 uses columns 112 that compress the compression elements 10 when the plunger 116 moves axially into the casing 114, the columns 112 may be configured so that the compression elements 10 are compressed when the plunger 116 moves axially out of the casing 114. As illustrated in FIG. 23, the plunger 116 includes an elongated rod 122 so that the large circular portion 120 of the plunger 116 may be placed at the opposite end of the casing 114 near the coupling member 126. The inner flange 14 of each compression element 10 is annular so that the compression elements 10 can be disposed within the casing by sliding them over the rod 122. After the compression elements 10 have been placed in the casing, the locking member 118 is coupled to the casing 114 to secure the compression elements.

With this configuration, axial movement of the plunger 116 out of the casing 114 compresses the compression elements 10. A column 112 of this type may be used in a riser tensioner system, such as the system 130. The termination 124 of each plunger 116 is pivotally coupled to the riser 56 via a hub 128 having a plurality of radially extending pivotal coupling members 129, and the coupling member 126 of each casing 114 is pivotally coupled to the bottom of the platform 62. The columns 112 are preferably preloaded to place the compression elements 10 in an initial state of compression. Then, when the riser 56 begins to stroke and moves axially away from the platform 62, the compression elements 10 within each column compress further to maintain an axially upward force on the riser 56.

The systems 110 and 130 introduce an additional variable into the problem of designing a riser tensioner system that maintains a substantially constant upward force on the riser as it strokes. Unlike the previously described systems, the columns of the systems 110 and 130 are not disposed parallel to the longitudinal axis of the riser. Thus, the angle at which the columns 112 are coupled to the riser and the manner in which the angle changes when the riser strokes must be taken into account when determining the axial force characteristics of the systems 110 and 130. In other words, a vector analysis of the systems 110 and 130 must be performed to insure that the vertical components of the force vectors of the columns 112 remain substantially constant as the riser strokes.

As can be seen from the above discussion of the illustrative embodiments, the compression elements 10 offer significant advances over previous systems. Those skilled in the art will no doubt be able to apply these teachings and further improve upon the state of the art.

What is claimed is:

1. A compression element being deflectable along a longitudinal axis, said compression element comprising:

an inner flange having a curved outer coupling portion;

an outer flange having a curved inner coupling portion;

a deflectable member having an axial spring rate that varies within a given range, said deflectable member coupling said inner flange to said outer flange in an axially spaced apart relationship, said deflectable member having a first curved end coupled to said outer coupling portion of said inner flange and having a second curved end coupled to said inner coupling portion of said outer flange; and at least one curved reinforcement disposed in said deflectable member, wherein said curved outer coupling portion, said curved inner coupling portion, and said at least one curved reinforcement share a pair of common focal points substantially displaced diametrically from said longitudinal axis in a central longitudinal cross-section and wherein relative axial movement of said inner flange toward said outer flange compresses said deflectable member and decreases said axial spring rate of said deflectable member.

2. The compression element, as set forth in claim 1, wherein said deflectable member is shaped like a hollow, truncated cone having a given conical angle, a truncated end, and a base end, said truncated end being coupled to said outer coupling portion of said inner flange and said base end being coupled to said inner coupling portion of said outer flange, wherein relative axial movement of said inner flange toward said outer flange compresses said deflectable member and increases said conical angle, thus decreasing said given axial spring rate of said deflectable member.

3. The compression element, as set forth in claim 2, wherein said cone of said deflectable member has a plurality of slots that extend radially outwardly from a central hub.

4. A riser tensioner system for applying a tensioning force to a riser and allowing a floating platform to move within a given range along a longitudinal axis of said riser, said system comprising:

a compression element being deflectable along said longitudinal axis, said compression element having:

an inner flange having a curved outer coupling portion;

an outer flange having a curved inner coupling portion;

a deflectable member having an axial spring rate that varies within a given range, said deflectable member coupling said inner flange to said outer flange in an axially spaced apart relationship, said deflectable member having a first curved end coupled to said outer coupling portion of said inner flange and having a second curved end coupled to said inner coupling portion of said outer flange; and at least one curved reinforcement disposed in said deflectable member, wherein said curved outer coupling portion, said curved inner coupling portion, and said at least one curved reinforcement share a pair of common focal points substantially displaced diametrically from said longitudinal axis in a central longitudinal cross-section;

said inner flange being coupled to said riser and said outer flange being coupled to said platform, wherein relative axial movement of said inner flange toward said outer flange compresses said deflectable member and decreases said axial spring rate of said deflectable member such that said tensioning force on said riser remains substantially constant throughout said range.

5. The system, as set forth in claim 4, wherein said deflectable member is shaped like a hollow, truncated cone having a given conical angle, a truncated end, and a base end, said truncated end being coupled to said outer coupling portion of said inner flange and said base end being coupled to said inner coupling portion of said outer flange, wherein relative axial movement of said inner flange toward said outer flange compresses said deflectable member and increases said conical angle, thus decreasing said given axial spring rate of said deflectable member.

6. The system, as set forth in claim 5, wherein said cone of said deflectable member has a plurality of slots that extend radially outwardly from a central hub.

7. A riser tensioner system for applying a tensioning force to a riser and allowing a floating platform to move within a given range along a longitudinal axis of said riser, said system comprising:

a columnar stack of compression elements having a top compression element and a bottom compression element, said stack of compression elements being deflectable in response to certain relative movement between said riser and said platform along said longitudinal axis, each of said compression elements having:

an inner flange having a curved outer coupling portion;

an outer flange having a curved inner coupling portion;

a deflectable member having an axial spring rate that varies within a given range, said deflectable member coupling said inner flange to said outer flange in an axially spaced apart relationship, said deflectable member having a first curved end coupled to said outer coupling portion of said inner flange and having a second curved end coupled to said inner coupling portion of said outer flange; and at least one curved reinforcement disposed in said deflectable member, wherein said curved outer coupling portion, said curved inner coupling portion, and said at least one curved reinforcement share a pair of common focal points substantially displaced diametrically from said longitudinal axis in a central longitudinal cross-section;

said top compression element being coupled to said riser and said bottom compression element being coupled to said platform, wherein relative axial movement of said inner flanges of said compression elements in said stack toward said respective outer flanges of said compression elements in said stack compresses said deflectable members of said compression elements in said stack and decreases said axial spring rate of each of said deflectable members such that said tensioning force on said riser remains substantially constant throughout said range.

8. The system, as set forth in claim 7, wherein at least one of said deflectable members is shaped like a hollow, truncated cone having a given conical angle, a truncated end, and a base end, said truncated end being curved and complementarily coupled to said curved outer portion of said inner flange and said base end being curved and complementarily coupled to said curved inner coupling portion of said outer flange, wherein relative axial movement of said inner flange toward said outer flange compresses said at least one deflectable member and increases said conical angle, thus decreasing said given axial spring rate of said at least one deflectable member.

9. The system, as set forth in claim 8, wherein said cone of said deflectable member has a plurality of slots that extend radially outwardly from a central hub.

10. The system, as set forth in claim 7, further comprising:

a preload device coupled to said columnar stack of compression elements for compressing said columnar stack of compression elements and placing said columnar stack of compression elements within a selected deflection range.

11. The system, as set forth in claim 7, wherein said columnar stack of compression elements defines an internal space and further comprises an inlet for introducing compressible gas into said internal space, said compressible gas altering said spring rate of said columnar stack of compression elements.

12. A riser tensioner system for applying a tensioning force to a riser and allowing a floating platform to move within a given range along a longitudinal axis of said riser, said system comprising:

a support member being coupled to said riser and having a portion extending radially outwardly from said riser; and a plurality of columns of compression elements, each column having an upper end portion being coupled to said radially extending portion of said support member and having a lower end portion being coupled to said platform, each column being deflectable in response to certain relative movement between said riser and said platform along said longitudinal axis, each column comprising compression elements having:

an inner flange having a curved outer coupling portion;

an outer flange having a curved inner coupling portion;

a deflectable member having an axial spring rate that varies within a given range, said deflectable member coupling said inner flange to said outer flange in an axially spaced apart relationship, said deflectable member having a first curved end coupled to said outer coupling portion of said inner flange and having a second curved end coupled to said inner coupling portion of said outer flange; and at least one curved reinforcement disposed in said deflectable member, wherein said curved outer coupling portion, said curved inner coupling portion, and said at least one curved reinforcement share a pair of common focal points substantially displaced diametrically from said longitudinal axis in a central longitudinal cross-section;

wherein relative movement of said platform toward said support member along said longitudinal axis of said riser produces relative axial movement of each of said inner flanges toward each of said outer flanges in each of said compression elements in each of said columns which compresses each of said deflectable members and decreases said axial spring rate of each of said deflectable members such that said tensioning force on said riser remains substantially constant throughout said range.

13. The system, as set forth in claim 12, wherein at least one of said deflectable members is shaped like a hollow, truncated cone having a given conical angle, a truncated end, and a base end, said truncated end being curved and complementarily coupled to said curved outer portion of said inner flange and said base end being curved and complementarily coupled to said curved inner coupling portion of said outer flange, wherein relative axial movement of said inner flange toward said outer flange compresses said at least one deflectable member and increases said conical angle, thus decreasing said given axial spring rate of said at least one deflectable member.

14. The system, as set forth in claim 13, wherein said cone of said at least one deflectable member has a plurality of slots that extend radially outwardly from a central hub.

15. The system, as set forth in claim 12, further comprising:

a preload device coupled to said support member for compressing said columns of compression elements and placing said columns of compression elements within a selected deflection range.

16. The system, as set forth in claim 12, wherein each of said plurality of columns of compression elements defines an internal space and further comprises an inlet for introducing compressible gas into said internal space, said compressible gas altering said spring rate of said respective column of compression elements.

* * * * *